United States Patent
Westphal

(10) Patent No.: US 10,469,348 B2
(45) Date of Patent: Nov. 5, 2019

(54) CENTRALITY-BASED CACHING IN INFORMATION-CENTRIC NETWORKS

(71) Applicant: Futurewei Technologies, Inc., Plano, TX (US)

(72) Inventor: Cedric Westphal, Santa Clara, CA (US)

(73) Assignee: Futurewei Technologies, Inc., Plano, TX (US)

(*) Notice: Subject to any disclaimer, the term of this patent is extended or adjusted under 35 U.S.C. 154(b) by 162 days.

(21) Appl. No.: 15/393,937

(22) Filed: Dec. 29, 2016

(65) Prior Publication Data

US 2018/0191590 A1  Jul. 5, 2018

(51) Int. Cl.
*H04L 12/26* (2006.01)
*H04L 29/08* (2006.01)

(52) U.S. Cl.
CPC .......... *H04L 43/0811* (2013.01); *H04L 67/22* (2013.01); *H04L 67/2842* (2013.01)

(58) Field of Classification Search
CPC ... H04L 43/0811; H04L 67/22; H04L 67/2842
USPC ........................................................ 709/224
See application file for complete search history.

(56) References Cited

U.S. PATENT DOCUMENTS

| 2004/0073707 A1* | 4/2004 | Dillon ............... H04L 29/12009 709/245 |
| 2006/0106923 A1* | 5/2006 | Balasubramonian ........................ G06F 9/3828 709/223 |
| 2012/0303348 A1 | 11/2012 | Lu et al. |
| 2013/0103678 A1* | 4/2013 | Tretjakov .......... G06F 17/30979 707/723 |
| 2014/0142903 A1* | 5/2014 | Gullapalli ........... G06F 17/5022 703/2 |
| 2015/0023206 A1* | 1/2015 | Le Merrer .............. H04L 41/12 370/254 |
| 2015/0134807 A1 | 5/2015 | Narayanam |
| 2015/0227581 A1* | 8/2015 | Yacoub ............. G06F 17/30424 707/722 |

(Continued)

OTHER PUBLICATIONS

"COntent Mediator architecture for content-aware nETworks (COMET)", [online]. © 2010 The Comet Corporation. [archived on Apr. 10, 2016]. Retrieved from the Internet: <URL: https://web.archive.org/web/20160410054537/http://www.comet-project.org/>, (2010), 1 pg.

(Continued)

*Primary Examiner* — Joseph L Greene
(74) *Attorney, Agent, or Firm* — Schwegman Lundberg & Woessner, P.A.

(57) ABSTRACT

Various embodiments include methods and apparatus structured to cache items of content in an information-centric network (ICN). The caching of the items of content can be based on a centrality metric for the node related to connectivity of the node to other nodes within the network of nodes and to popularity of each of the items being stored. The storing of items not currently stored in the network may be made, in an iterative process, by storing each item in a cache of a node having lowest centrality metric of the nodes, in order of decreasing popularity from a most popular item, until the cache of the node is filled. Additional apparatus, systems, and methods can be implemented in a variety of applications.

20 Claims, 4 Drawing Sheets

(56) References Cited

U.S. PATENT DOCUMENTS

2015/0245167 A1* 8/2015 Bobrow ............... H04W 4/023
            455/41.2
2016/0232212 A1  8/2016 Tang
2017/0202001 A1* 7/2017 Guo ...................... H04W 84/10

OTHER PUBLICATIONS

Chai, Wei Koong, et al., "Cache "Less for More" in Information-Centric Networks", *Networking 2012, Part 1, LNCS 7289*, (2012), 27-40.

Chai, Wei Koong, et al., "Cache "Less for More" in Information-centric Networks", Power Point Presentation, (2012), 17 pgs.

Chai, Wei Koong, et al., "Cache "less for more" in Information-centric networks (extended version)", *Computer Communications*, 36(7), (Apr. 2013), 758-770.

Chai, Wei Koong, et al., "CURLING: Content-Ubiquitous Resolution and Delivery Infrastructure for next-Generation Services", *IEEE Communications Magazine*, 49(3), (Mar. 2011), 112-120.

Ghodsi, Ali, et al., "Information-Centric Networking: Seeing the Forest for the Trees", *Proceedings of the 10th ACM Workshop on Hot Topics in Networks, Article No. 1*, (2011), 1-6.

Nguyen, Dinh, et al., "Centrality-Based Network Coder Placement for Peer-to-Peer Content Distribution", *International Journal of Computer Networks & Communications (IJCNC)*, vol. 5, No. 3. (May 2013), 157-174.

Pantazopoulos, Panagiotis, et al., "Efficient Social-aware Content Placement in Opportunistic Networks", *IEEE/IFIP WONS 2010—The Seventh International Conference on Wireless On-demand Network Systems and Services*, (2010), 17-24.

Psaras, Ioannis, et al., "Modelling and Evaluation of CCN-Caching Trees", *Networking 2011, Part 1, LNCS 6640*, (2011), 78-91.

Psaras, Ioannis, et al., "Probabilistic In-Network Caching for Information-Centric Networks", *Proceedings of the Second Edition of the ICN Workshop on Information-centric Networking (ICN '12)*, Aug. 17, 2012, Helsinki, Finland, (2012), 55-60.

Rossi, Dario, et al., "On sizing CCN content stores by exploiting topological information", *IEEE INFOCOM 2012 Workshop on Emerging Design Choices in Name-Oriented Networking*, (2012), 280-285.

Wang, Liang, "Content, Topology and Cooperation in In-network Caching", PhD Thesis, Department of Computer Science, Series of Publications A, Report A-2015-1, (2015), 200 pgs.

Wang, Yonggong, et al., "Optimal Cache Allocation for Content-Centric Networking", *21st IEEE International Conference on Network Protocols (ICNP)*, (Oct. 2013), 10 pgs.

"International Application Serial No. PCT CN2017 120058, International Search Report dated Mar. 16, 2018", 4 pgs.

"International Application Serial No. PCT CN2017 120058, Written Opinion dated Mar. 16, 2018", 4 pgs.

\* cited by examiner

CENTRALITY-BASED CACHING IN INFORMATION-CENTRIC NETWORKS

FIELD OF THE INVENTION

The present disclosure is related to information centric networks and cache networks.

BACKGROUND

An information centric network (ICN) is a network architecture directed to information delivery. ICNs may also be known as content-aware, content-centric, or data specific networks. ICNs relate to information-object-to-object models, which utilize a non-location based addressing scheme that is content-based. The entities that are distributed or operated on in an ICN communication model are information objects. Some examples of information objects may include content, data streams, services, user entities, and/or devices. An ICN supports flows initiated by a request for content from a consumer of the content, where the consumer may be inside the network or in a different network domain. The network receives the request and the content flows back through the network. Content is uniquely associated with its name, which is used to address the information objects, decoupling the information objects from locations. A content size can be associated with the content's name.

In such networks, nodes participating in the network hold some content and other nodes can retrieve the content either from a server or from nodes that are nearby. A node is instrumentality that operates to store, request, and transmit information, where the instrumentality can include a device having applications to manage the operation of the respective device. For example, nodes retrieving content from a server may use a link such as LTE (long-term evolution) wireless uplink or some other wireless technology to connect to the Internet. Nodes retrieving content from nodes that are nearby may use some proximity technology to connect to these nodes and other nodes in the vicinity. A key issue for an ICN includes the determination of what content to cache at each node of a local network for efficient distribution of and access to the content.

SUMMARY

A processor-implemented method of caching information in an information-centric network (ICN) comprises generating, at a node of a network of nodes using one or more processors, a centrality metric for the node, based upon connectivity of the node to other nodes within the network of nodes. The method includes determining, at the node using the one or more processors, when the centrality metric of the node is a lowest centrality metric of the nodes of the network of nodes with respect to storing a set of content in caches of the nodes of the network, where the content is not currently stored in the network. Items of the set of content are stored in the cache at the node, having the lowest centrality metric, in order of decreasing popularity from a most popular item, until the cache of the node is filled.

A processor-implemented method of caching information in an information-centric network (ICN) comprises at each node of a network of nodes, generating, using one or more processors at the node, a centrality metric for the node, based upon connectivity of the node to other nodes within the network of nodes. A set of items of content is stored in the network, each item of content of the set associated with a value of popularity of the respective item of content, where items are stored in caches at nodes of the network with items of decreasing popularity added to the nodes of the network in increasing order of centrality metric beginning with an item of the set identified as being most popular content stored in a cache of the node having a lowest centrality metric. The cache of the node having the lowest centrality metric is filled with items of the set until the cache is filed, where each item is stored at only one node of the network.

A device comprises a non-transitory memory storage storing instructions; a cache; and one or more processors operatively in communication with the non-transitory memory storage, wherein the one or more processors are structured to execute the instructions to operate the device as part of a node of a network of nodes. The one or more processors are structured to execute the instructions to generate a centrality metric for the node, based upon connectivity of the node to other nodes within the network of nodes. The one or more processors are structured to execute the instructions to determine when the centrality metric of the node is a lowest centrality metric of the nodes of the network of nodes with respect to storage of a set of content in caches of the nodes of the network when the content is not currently stored in the network; and to store items of the set of content in the cache at the node in order of decreasing popularity from a most popular item, until the cache of the node is filled.

A non-transitory machine-readable media stored instructions to store content in caches of a network of nodes, which when executed by one or more processors, cause the one or more processors to perform operations to generate a centrality metric for a node, based upon connectivity of the node to other nodes within the network of nodes. The operations include operations to determine when the centrality metric of the node is a lowest centrality metric of the nodes of the network of nodes with respect to storage of a set of content in caches of the nodes of the network when the content is not currently stored in the network. The operations include operations to store items of the set of content in the cache at the node in order of decreasing popularity from a most popular item, until the cache of the node is filled.

Various examples are now described to introduce a selection of concepts in a simplified form that are further described below in the detailed description. The Summary is not intended to identify key or essential features of the claimed subject matter, nor is it intended to be used to limit the scope of the claimed subject matter.

In an example 1, a processor-implemented method of caching information in an information-centric network (ICN) comprises: generating, at a node of a network of nodes using one or more processors, a centrality metric for the node, based upon connectivity of the node to other nodes within the network of nodes; determining, at the node using the one or more processors, when the centrality metric of the node is a lowest centrality metric of the nodes of the network of nodes with respect to storing a set of content in caches of the nodes of the network, the content not currently stored in the network; and storing items of the set of content in the cache at the node in order of decreasing popularity from a most popular item, until the cache of the node is filled.

In an example 2, a processor-implemented method includes the elements of example 1 and includes generating the centrality metric for the node to include computing the centrality metric at the node; and determining, at the node, that the centrality metric of the node is the lowest centrality metric includes receiving, at the node, the centrality metric for each of the other nodes of the network.

In an example 3, a processor-implemented method includes the elements of examples 1 and 2 and includes computing the centrality metric at the node to include message passing between the node and the other nodes of the network.

In an example 4, a processor-implemented method includes the elements of any of examples 1-3 and includes the network of nodes being a neighborhood of a larger network.

In an example 5, a processor-implemented method includes the elements of example 4 and can include elements of any of examples 1-3 and includes the centrality metric being a centrality metric selected from a group of centrality metrics including node degree, cardinality of a h-hop neighborhood, cardinality of neighborhoods reachable by the node within the larger network, betweenness centrality, closeness centrality, and eigenvalue centrality.

In an example 6, a processor-implemented method includes the elements of example 5 and can include elements of any of examples 1-4 and includes cardinality of the h-hop neighborhood being based on using a delay constraint to define in the h-hop neighborhood.

In an example 7, a processor-implemented method of caching information in an information-centric network (ICN) comprises: at each node of a network of nodes, generating, using one or more processors at the node, a centrality metric for the node, based upon connectivity of the node to other nodes within the network of nodes; and storing a set of items of content in the network, each item of content of the set associated with a value of popularity of the respective item of content, items stored in caches at nodes of the network with items of decreasing popularity added to the nodes of the network in increasing order of centrality metric beginning with an item of the set identified as being most popular content stored in a cache of the node having a lowest centrality metric, the cache of the node having the lowest centrality metric filled with items of the set until the cache is filed, each item stored at only one node of the network.

In an example 8, a processor-implemented method includes the elements of example 7 and includes generating the centrality metric for each node to include at each node, computing the centrality metric at the node; and communicating the computed centrality metric to the other nodes within the network.

In an example 9, a processor-implemented method includes the elements of examples 8 and 7 and includes computing the centrality metric of each node to include message passing among the nodes of the network.

In an example 10, a processor-implemented method includes the elements of example 7 and can include elements of any of examples 8 and 9 and includes generating the value of popularity of content for each item at each node by one or more of a control message generated off line to the nodes by a content operator, local generation at each node from local monitoring of content, or indication as part of a content header from a service provider.

In an example 11, a processor-implemented method includes the elements of example 7 and can include elements of any of examples 8-10 and includes generating a routing table with entries correlated to data at a node that is indicative of content location in the network.

In an example 12, a processor-implemented method includes the elements of example 7 and can include elements of any of examples 8-11 and includes the network of nodes being a neighborhood of a larger network having a plurality of neighborhoods in which each item is stored in each neighborhood of the plurality of neighborhoods and each item is stored at only one node in each neighborhood of the plurality of neighborhoods.

In an example 13, a device comprises: a non-transitory memory storage storing instructions; a cache; and one or more processors operatively in communication with the non-transitory memory storage, wherein the one or more processors are structured to execute the instructions to operate the device as part of a node of a network of nodes and to: generate a centrality metric for the node, based upon connectivity of the node to other nodes within the network of nodes; determine when the centrality metric of the node is a lowest centrality metric of the nodes of the network of nodes with respect to storage of a set of content in caches of the nodes of the network when the content is not currently stored in the network; and store items of the set of content in the cache at the node in order of decreasing popularity from a most popular item, until the cache of the node is filled.

In an example 14, a device includes the elements of example 13 and includes a communication interface operable to receive the centrality metric of each of the other nodes of the network; the instructions include instructions to compute the centrality metric at the node within the device; and the instructions include instructions to compute the position of the node in a listing of centrality metrics of the nodes in order between lowest centrality metric and highest centrality metric using the received centrality metrics and the computed centrality metric.

In an example 15, a device includes the elements of example 13 and can include elements of example 14 and includes the centrality metric being a centrality metric selected from a group of centrality metrics including node degree, cardinality of a h-hop neighborhood, cardinality of neighborhoods reachable by the node within the larger network, betweenness centrality, closeness centrality, and eigenvalue centrality.

In an example 16, a device includes the elements of example 13 and can include elements of examples 14 and 15 and includes the instructions to include instructions to generate a value of popularity of content for each item cached in the device by executing one or more operations from a group of operations including reception of the values from a control message generated off line to the device by a content operator, local generation from local monitoring of content, or extraction of an indication as part of a content header from a service provider.

In an example 17, a non-transitory machine-readable media storing instructions to store content in caches of a network of nodes, which when executed by one or more processors, cause the one or more processors to perform operations to: generate a centrality metric for a node, based upon connectivity of the node to other nodes within the network of nodes; determine when the centrality metric of the node is a lowest centrality metric of the nodes of the network of nodes with respect to storage of a set of content in caches of the nodes of the network when the content is not currently stored in the network; and store items of the set of content in the cache at the node in order of decreasing popularity from a most popular item, until the cache of the node is filled.

In an example 18, a non-transitory machine-readable media includes the elements of example 17 and includes the instructions to include instructions to compute, within the node, the centrality metric at the node; to communicate with the other nodes of network to advertise its centrality metric and receive the centrality metrics of the other nodes; compute the position of the node in a listing of centrality metrics of the nodes in order between lowest centrality metric and highest centrality metric using the received centrality metrics and the computed centrality metric.

In an example 19, a non-transitory machine-readable media includes the elements of example 17 and can include elements of 18 and includes the centrality metric being a centrality metric selected from a group of centrality metrics including node degree, cardinality of a h-hop neighborhood, cardinality of neighborhoods reachable by the node within the larger network, betweenness centrality, closeness centrality, and eigenvalue centrality.

In an example 20, a non-transitory machine-readable media includes the elements of example 17 and can include elements of 18 and 19 and includes the instructions to include instructions to generate a value of popularity of content for each item cached in the device by executing one or more operations from a group of operations including reception of the values from a control message generated off line to the device by a content operator, local generation from local monitoring of content, or extraction of an indication as part of a content header from a service provider.

DETAILED DESCRIPTION

Figure 1:
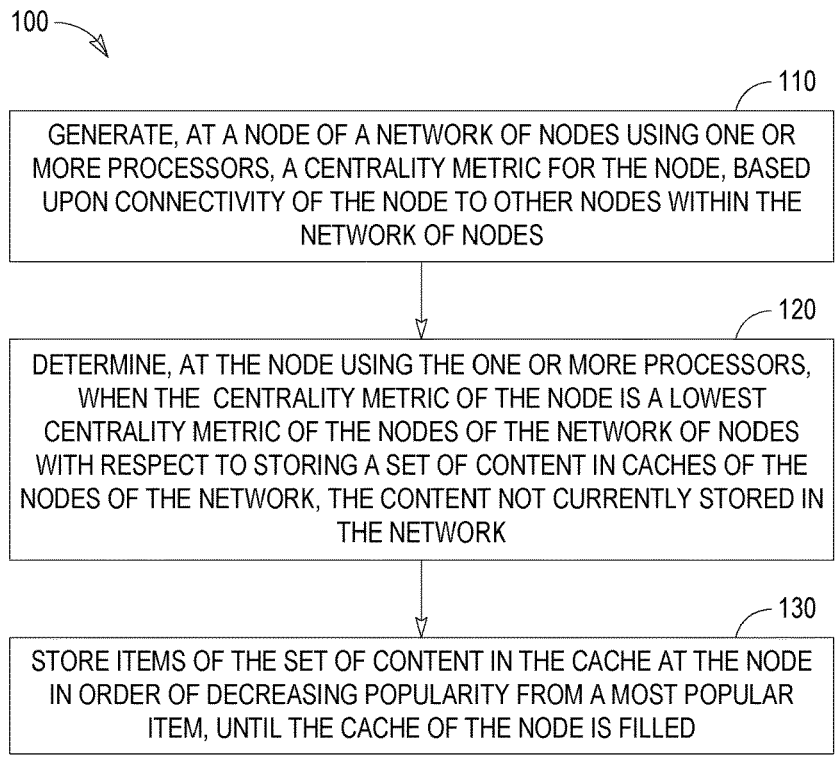
FIG. 1 is a flow diagram of features of an example processor-implemented method of caching information in an information-centric network, according to an example embodiment.

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

The functions or algorithms described herein may be implemented in software in an embodiment. The software may consist of computer executable instructions stored on computer readable media or computer readable storage device such as one or more non-transitory memories or other type of hardware based storage devices, either local or networked. Further, such functions correspond to modules, which may be software, hardware, firmware or any combination thereof. Multiple functions may be performed in one or more modules as desired, and the embodiments described are merely examples. The software may be executed on a digital signal processor, an application specific integrated circuit (ASIC), microprocessor, or other type of processor operating on a processing system, such as but not limited to a computer system, such as a personal signal processing device, personal computer, server, or other computer system, turning such processing system into a specifically programmed machine.

In various embodiments, properties of a graph defined by the topology of the nodes of a network can be used to select which content to cache at which node. In particular, the notion of graph centrality can be used, as it differentiates between different nodes within the topology. Because nodes are differently connected to other nodes, they don't offer the same caching performance. Approaches to content caching in a cache network associated with the nodes of the network can allow for efficient distribution of content. With respect to a cache at a node, each node has some local storage attached, that it uses to participate in an ad hoc network related to local storage of content. This is similar to peer-to-peer nodes. In peer-to-peer networks, some policies have been implemented so that nodes share their resource (network and storage). Nodes of the ICN can share their resource to benefit from better performance or to benefit from payoff for a network operator for offloading content from the infrastructure to the ad hoc network.

As taught herein, systems to distribute content using local nodes in addition to the uplink provided by the service operator can be implemented, where the nodes select the content to cache based upon their topological properties within the local network. In such systems, nodes select the content according to an algorithm that places the most popular content near the nodes that have the least connectivity. As a result of this storage of content, even these nodes with the least connectivity have access to the content. In an embodiment, the algorithm, in continuing to distribute the content storage in the network of nodes, removes the nodes that have full cache from consideration in the continued distribution. With nodes having no further capacity in their cache to storage content, the algorithm iterates in placing the most popular content towards the least connected node.

In various embodiments, combination of the underlying topology structure of the network of nodes and the content popularity define a content placement in the cache of the nodes. Therefore, all nodes of the network have access locally to some content that is popular, increasing the cache hits and reducing bandwidth consumption. Such a content placement can have application to vehicular networks, internet of things (IoT) networks (which have limited capacity and would prefer local content), media distribution networks, virtual reality (VR) rendering, and other applications having similar properties.

Assume that content follows a popularity distribution in which content $c_1$ has a probability $p_1$ of being selected ($c_1$, $p_1$), content $c_2$ has a probability $p_2$ of being selected ($c_2$,$p_2$) . . . content $c_1$ has a probability $p_r$ of being selected ($c_1$, $p_1$) . . . , with $p_1 > p_2 > p_3 > \ldots > p_r$ and with the $p_k$s having a distribution. For example, the $p_k$s can have a Zipf distribution. The content $\{c_1 \ldots , c_r\}$ forms a set of content with each $c_k$ being an item of the set. The items can be viewed as information objects. Also, assume the nodes of the network can fetch the content from a service provider or locally from peers of the nodes such as an ad hoc network of connected nodes. The underlying topology structure of the network of nodes can be utilized with respect to a centrality metric for the nodes, based upon connectivity of the nodes to other nodes within the network of nodes, to implement the process as presented in the algorithm discussed above.

Centrality is a measure of how many connections one node has to other nodes. A number of different centrality metrics may be used to identify the nodes in terms of an order of connectivity. Such metrics may include, but are not limited to, node degree, cardinality of a h-hop neighborhood, cardinality of neighborhoods reachable by the node within a larger network, betweenness centrality, conditional betweenness centrality, closeness centrality, eigenvalue centrality, and stress centrality. Node degree refers to the number of ties that a node has to other nodes in which a node having lowest centrality may be taken as the node with the smallest number of ties.

For a network that can be treated as a conglomeration of neighborhoods of nodes, a h-hop neighborhood of a node n includes all the nodes of the network that can be reached by transmission hopping along connections of the network from the node n in h number of hops. The h parameter can be selected according to a defined constraint for the network. The cardinality of a h-hop neighborhood for a node is the number of other nodes reachable from the node in h hops. In another neighborhood related metric, the cardinality of neighborhoods reachable by a node within a larger network that has multiple neighborhoods of nodes within the larger network is the number of neighborhoods that can be reached from the node according to a defined constraint for the network.

With respect to betweenness centrality, betweenness is a measure of the extent to which a node is connected to other nodes that are not directly connected to each other. It can provide a measure of the degree to which a node serves as a bridge. This measure can be calculated in absolute value, as well as in terms of a normed percentage of the maximum possible betweenness that a node can have. Conditional betweenness centrality (CBC) for node u relative to node t equals the number of shortest paths between s and t in the network, in which each such path includes u, divided by the number of shortest paths between s and t.

Closeness centrality is a measure of the degree to which a node is near all other nodes in a network. It is the inverse of the sum of the shortest distances between each node and every other node in the network. Closeness is the reciprocal of farness. Closeness can also be calculated as a measure of inequality in the distribution of distances across the nodes.

Eigenvalue centrality is a measure of the influence of a node in a network, which assigns relative scores to all nodes in the network based on the premise that connections to high-scoring nodes contribute more to the score of the node in question than equal connections to low-scoring nodes. Stress centrality of a node is the number of shortest paths passing through the node. A node has a high stress if it is traversed by a high number of shortest paths.

In a process of assigning content to nodes in a network, as taught herein, allocating most popular content of a set of content not stored in nodes of the network to nodes with a lowest centrality metric, the centrality metric may be a selected centrality metric further modified by a constraint to handle conflicts between multiple nodes having the same lowest metric value according to the selected centrality metric. Using the constraint, each of the conflicting nodes can be assigned a lowest metric value different from the other conflicting nodes that remains lower in value relative to the centrality metrics of the nodes of the network that did not have the same lowest metric value initially computed.

Examples of such constraints to order nodes, originally computed as having the same value of its centrality metric, can include use of different random numbers assigned to these nodes, ordering by the lowest or highest identification number (ID) of these nodes, ordering in alphabetical order of the names of these nodes, or use of another random tie-breaker.

FIG. 1 is a flow diagram of features of an embodiment of an example of a processor-implemented method 100 of caching information in an ICN. At 110, at a node of a network of nodes using one or more processors, a centrality metric is generated for the node, based upon connectivity of the node to other nodes within the network of nodes. At 120, at the node using the one or more processors, method 100 includes determining when the centrality metric of the node is a lowest centrality metric of the nodes of the network of nodes with respect to storing a set of content in caches of the nodes of the network, where the content is not currently stored in the network. At 130, items of the set of content is stored in the cache at the node in order of decreasing popularity from a most popular item, until the cache of the node is filled.

Method 100 or methods similar to or identical to method 100 can include generating the centrality metric for the node can to include computing the centrality metric at the node; and determining, at the node, that the centrality metric of the node is the lowest centrality metric can include receiving, at the node, the centrality metric for each of the other nodes of the network. Computing the centrality metric at the node can include message passing between the node and the other nodes of the network. Alternatively, generating the centrality metric for the node can include receiving the centrality metric of the node from a network controller that can communicates with the node.

Method 100 or methods similar to or identical to method 100 can include the network of nodes being a neighborhood of a larger network. In such a network in a larger network, the centrality metric can be a centrality metric selected from a group of centrality metrics including node degree, cardinality of a h-hop neighborhood, cardinality of neighborhoods reachable by the node within the larger network, betweenness centrality, closeness centrality, and eigenvalue centrality. The cardinality of the h-hop neighborhood can be based on using a delay constraint to define in the h-hop neighborhood.

Figure 2:
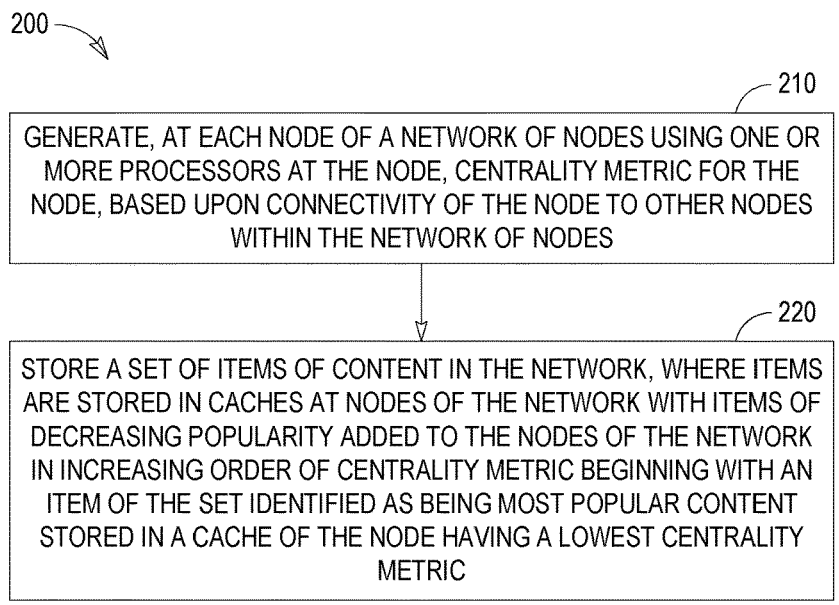
FIG. 2 is a flow diagram of features of an example processor-implemented method of caching information in an information-centric network, according to an example embodiment.

FIG. 2 is a flow diagram of features of an embodiment of an example of a processor-implemented method 200 of caching information in an ICN. At 210, at each node of a network of nodes using one or more processors at the respective node, a centrality metric is generated for the node, based upon connectivity of the node to other nodes within the network of nodes. At 220, a set of items of content is stored in the network, where items are stored in caches at nodes of the network with items of decreasing popularity added to the nodes of the network in increasing order of centrality metric beginning with an item of the set identified as being most popular content stored in a cache of the node having a lowest centrality metric. Each item of content of the set is associated with a value of popularity of the respective item of content such that the cache of the node having the lowest centrality metric is filled with items of the set until the cache is filed. Each item is stored at only one node of the network in accordance with the identified connectivity.

Method 200 or methods similar to or identical to method 200 can include generating the centrality metric for each node to include at each node, computing the centrality metric at the node; and communicating the computed centrality metric to the other nodes within the network. Computing the centrality metric of each node can include message passing among the nodes of the network. Alternatively, generating the centrality metric for each node can include receiving the centrality metric of the respective node from a network controller that can communicates with each node. The network controller may also communicate the computed centrality metric of each node to the other nodes within the network.

Method 200 or methods similar to or identical to method 200 can include generating the value of popularity of content for each item at each node by one or more of a control message generated off line to the nodes by a content operator, local generation at each node from local monitoring of content, or indication as part of a content header from a service provider. Such methods can include generating a routing table with entries correlated to data at a node that is indicative of content location in the network.

Method 200 or methods similar to or identical to method 200 can include the network of nodes being a neighborhood of a larger network having a plurality of neighborhoods in which each item can be stored in each neighborhood of the plurality of neighborhoods and each item can be stored at only one node in each neighborhood of the plurality of neighborhoods. Similar to method 100, the centrality metric for the neighborhoods can be a centrality metric selected from a group of centrality metrics including node degree, cardinality of a h-hop neighborhood, cardinality of neighborhoods reachable by the node within the larger network, betweenness centrality, closeness centrality, and eigenvalue centrality.

Figure 3:
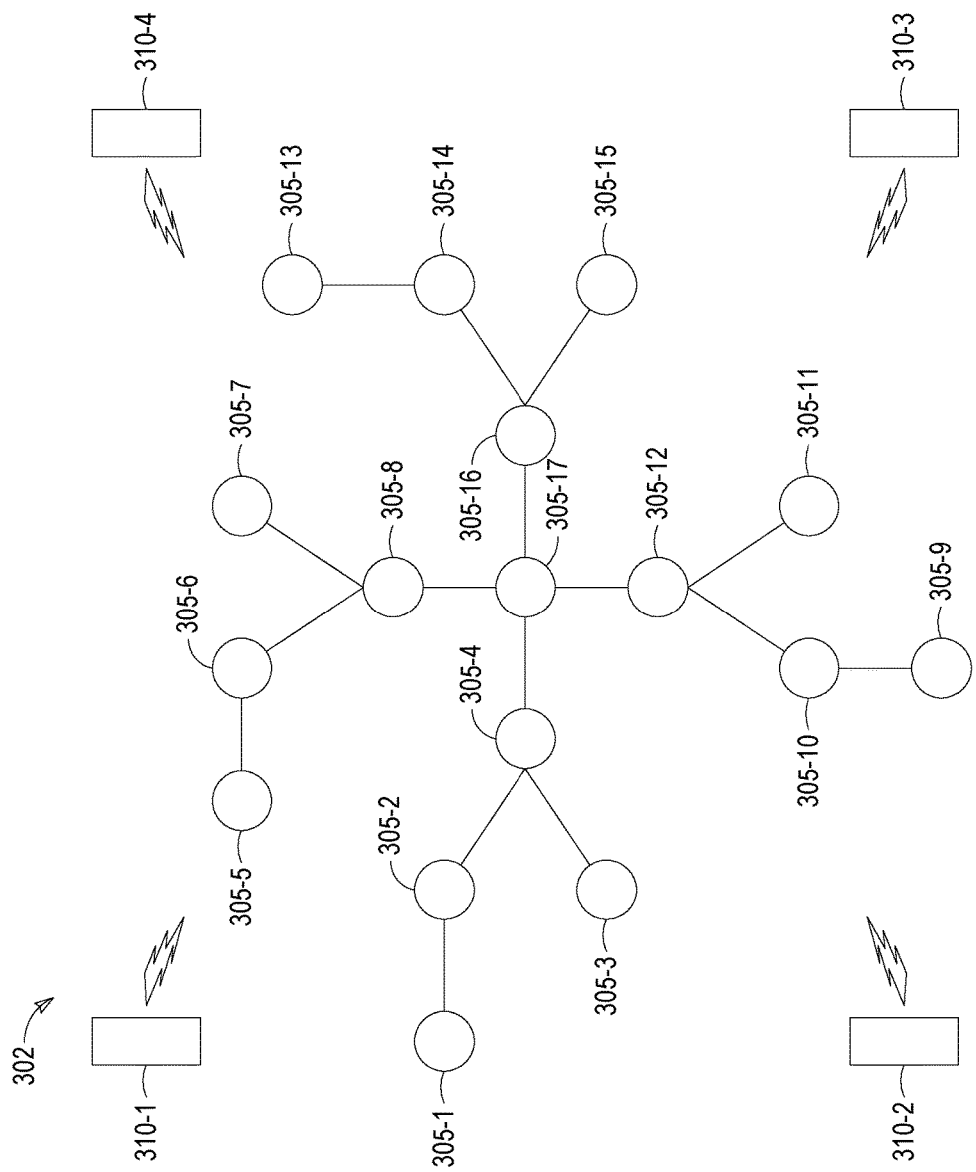
FIG. 3 is a representation of an information-centric network in which a number of nodes share content that is stored within the nodes of the network, according to an example embodiment.

FIG. 3 is a representation of an ICN 302 in which a number of nodes share content that is stored within the nodes of network 302. The content can be stored within a node in accordance with a process similar to or identical to features associated with method 100 and within network procedures in accordance with a process similar to or identical features associated with method 200. In this example, network 302 includes nodes 305-1 . . . 305-17; however, the number of nodes can be more or less seventeen. In addition, the arrangement of nodes 305-1 . . . 305-17 is not limited to the arrangement shown in FIG. 3. For instance, the arrangement of nodes 305-1 . . . 305-17 can include a mesh structure. Content can be provided to the nodes 305-1 . . . 305-17 of network 302 by a number of sources such as, but not limited to, sources 310-1 . . . 310-4. Content may be acquired through downloading it from an operator, from other peers in an ad hoc network, or by filtering what gets cached locally. For instance, only the most popular content may be cached based upon an estimate of the popularity of the content. This estimate could be computed globally and shared by the service provider, or computed in a distributed manner locally and shared within a neighborhood, or computed locally at each node.

In accordance with methods 100 and 200, a set of content can be stored in network 302 based on a lowest centrality metric and a popularity function of the content. The application of the centrality metric for the network depends on the connectivity of each node to other nodes in network 302 and on one or more criteria for providing content from one node to other within network 302. The connectivity and the one or more criteria can be used to partition network 302 into neighborhoods to store the content in the neighborhoods within network 302.

Figure 4:
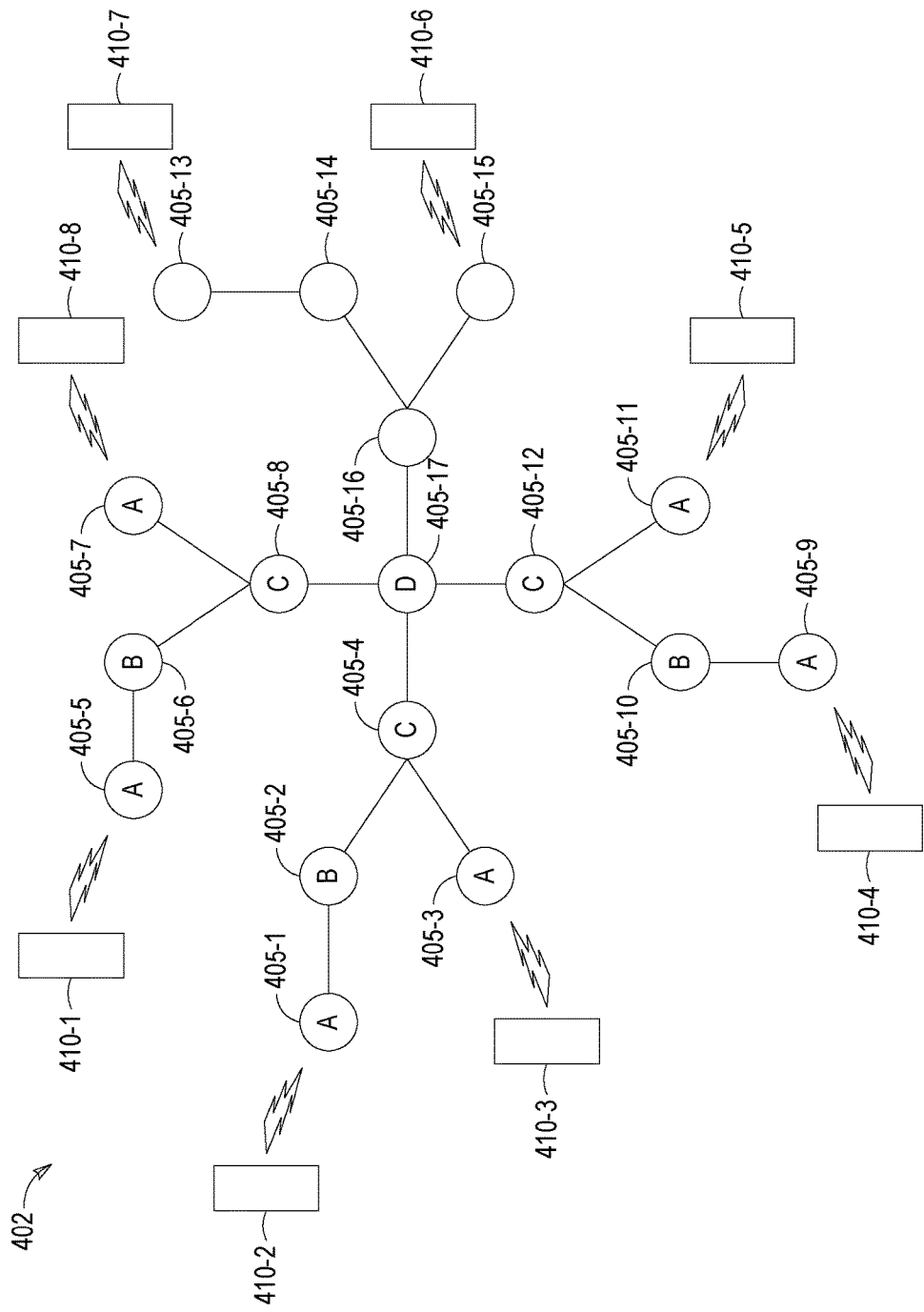
FIG. 4 is an example representation of a network illustrating storage of a set of items of content in the network, based on popularity of each item and a selected centrality metric, according to an example embodiment.

FIG. 4 is an example representation of an embodiment of a network 402 illustrating storage of a set of items of content in the network, based on popularity of each item and a selected centrality metric. For this illustration, the selected centrality metric can be taken to be a local centrality with respect to a number of nodes within h hops, where h is defined to satisfy a constraint. The constraint can be a delay constraint, which allows transmission of content to another node in a timely manner. For the illustration of FIG. 4, h equals 2. The centrality metric can be taken to be the local centrality, LCn(h), defined as the number of neighbors within h hops, which is an indicator of how central a node is. The higher the LC for node n, the more central is node n.

In an embodiment, for each node i, a determination can be made of its LCi(h). This determination can be conducted with each node computing its LCi(h). The computation can be facilitated by message passing among the nodes. Alternatively, or in addition, a determination of each node's LCi(h) can be made by a network controller that can communicates the LCi(h) to each node. Each node n can advertise its LCn(h)within its h hop neighborhood hHN(n). Alternatively, or in addition, a network controller can advertise the LCi(h) of each node i to other nodes within the h hop neighborhood hHN(n).

In the illustration of FIG. 4, network 402 is similar or identical to network 302 of FIG. 3, in which procedures associated with methods 100 and 200 are used to distribute a set of items of content to the caches of the nodes 405-1 . . . 405-17. In network 402, the degree of connectivity, d, varies among the nodes 405-1 . . . 405-17. For example, node 405-13 has a degree of 1; node 405-14 has a degree of 2; node 405-16 has a degree of 3; node 405-17 has a degree of 4; and node 405-15 has a degree of 1. Viewing FIG. 4, it can be seen that node 405-13 and node 405-15 are leaf nodes with the least degree of connectivity. However, in the 2-hop connectivity for generating the LC(2) for node 405-13 and node 405-15, the LC(2) for node 405-13 is 2, while the LC(2) for node 405-15 is 3. The LC(2) for node 405-14 is 4; the LC(2) for node 405-16 is 7; and the LC(2) for node 405-17 is 12.

For this illustration, the set of content contains items A, B, C, and D, where each of the items A, B, C, and D has a probability of being selected, that is, a probability of being popular. In this illustration, the probability of item A of content being selected is set at 0.5, as its value of popularity. The probability of item B of content being selected is set at 0.3, as its value of popularity. The probability of item C of content being selected is set at 0.1, as its value of popularity. The probability of item D of content being selected is set at 0.1, as its value of popularity. For this illustration, the capacity of each cache at each node is one item of content.

In an embodiment, network 402 fills the items of content A, B, C, and D according to the following algorithm. First, nodes i with the lowest LCn(h) initiate the process. With the two hop connectivity of the network selected for this illustration, there are a number of neighborhoods included in network 402. Second, each node i with lowest LCn(h) fills its cache with the most popular content. Third, then in increasing order of LCn(h) from the lowest value, other nodes in the neighborhood of node i, hHN(i), add the next unstored popular content to its cache. Fourth, a next unstored popular content to a cache of a node of each neighborhood, hHN(i) can be filled until there is no more content to fill a cache or cache is filled. If a cache of a given node is full, the given node is out of consideration as a location for storage of unstored content. For nodes that have not been made out of consideration as a location for storage of content, the process can be repeated from the beginning, only considering content that is not in the hHN to add in unfilled caches of the hHN. By only considering content that is not in the hHN in the iterative process, the process does not store the same content at more than one node of the same neighborhood.

As shown in FIG. 4, item A is stored in multiple nodes of network 402 at nodes 405-13, 405-15, 405-11, 405-9, 405-3, 405-1, 405-5, and 405-7. However, in the 2-hop connectivity for the selected centrality metric, none of the nodes 405-13, 405-15, 405-11, 405-9, 405-3, 405-1, 405-5, and 405-7 share a common neighborhood. Thus, item A is stored in only one node in any neighborhood. Content can be provided to nodes 405-13, 405-15, 405-11, 405-9, 405-3, 405-1, 405-5, and 405-7 via a number of sources such as, but not limited to, sources 410-1 . . . 410-8. Using a different connectivity constraint and centrality metric, item A may be stored in less number of nodes of network 402 than the above example. For a network effectively having one neighborhood, each item of content may be stored in a cache of only one node of the network. With more content than can be cached in the above algorithm, the more popular content is stored in network 402 and the least popular may be unstored in the network to be access from storage outside the network of nodes such as from a service provider.

In the above example, for illustration purposes, the capacity of the cache of each node was set to one item of content. Typically, caches at nodes may have the capacity to hold significantly more than one item of content. With each node 405-1 . . . 405-17 of network 402 having a cache capacity greater than or equal to the sum of the items A, B, C, and D, all the items A, B, C, and D will be cached in the leaf nodes 405-13, 405-15, 405-11, 405-9, 405-3, 405-1, 405-5, and 405-7 and only these leaf nodes using the other parameters and the algorithm of this example.

The above example of FIG. 4 of distributing content to a network by assigning the most popular item of content to the node, having cache capacity, with the lowest centrality metric can be compared to known placement algorithms. For the arrangement of nodes as shown in FIG. 4, a standard greedy placement and a standard degree placement with the most popular item assigned to the node of highest centrality metric can be compared to the above process of assigning the most popular item to the lowest centrality metric. It can be shown that for the example parameters above for network 402, the standard greedy placement has an effective total download from a service provider of 1.2 and the degree placement has an effective total download from a service provider of 2, while the most popular item/lowest centrality metric placement has effective total download from a service provider of 0.4. The most popular item/lowest centrality metric placement of FIG. 4 provides significant improvement compared with the greedy or degree based placement.

Placements assigning most popular items of content with nodes having a lowest centrality metric, as taught herein, take into account several characteristics associated with distributing content to nodes of a network. First, nodes in an ICN get their content either from a service provider or from other nodes of the network. Since nodes that have low centrality typically will not have much content available to them from other nodes of the network, due to lack of having many neighbor nodes, the most popular content should be stored at these nodes to provide them with access to the most popular content. Well connected nodes of a network, which would have a relatively high centrality metric, will be able to find the content from the network in substantially every situation. Hence, the most popular content need not necessarily be assigned to the nodes with relatively high centrality metric.

Placements assigning most popular items of content with nodes having a lowest centrality metric, as taught herein, can use an identification regarding the popularity of the items. Such identification can provide an ordering of the items of content, which may be a list from most popular to least popular, a list from least popular to most popular, an assignment of value to each of the item of content, or other mapping of popularity to items of content. The popularity of each item of content to be stored in caches within the ICN and can be shared among the nodes of the network. The sharing can be accomplished in a number of different ways. The sharing can be conducted off line by the content operator. For example, sharing can be realized in as a control message from the content operator. The sharing can be conducted by local monitoring by the nodes. For example, at the nodes requests for content can be counted. Sharing of the popularity can be accomplished in coordination with a service provider.

The sharing can be conducted as an indication from part of the content header by the service provider. For instance, with a service provider knowing the popularity of the content, as well as the number of nodes in a network, such as a neighborhood of a larger network, and the capacity of the cache of each node, the service provider can then label the content for storage in a way such that nodes know which one to cache once they observe the content. In an example, a service provider can label content as having 100 popularity levels using a few bits in the content header. Each level may correspond to the caching capacity of a node in the local network. When a node is requested, if popularity is unknown, the node communicates with the service provider, and the service provider then returns the content with its popularity to the node. The node receiving this content and popularity may then indicate to an appropriate node in its neighborhood that it should cache this content and popularity and may even share the content with this node locally.

Routing in an ICN can be accomplished with routing to content. Routing may be conducted to nodes with a high number of neighbors, which may depend on the connectivity constraint for the nodes of the network, and to nodes with high betweenness centrality. A routing table can be populated with entries that pertain to the ability of a node to know where the content is located, rather than populating a routing table with entries towards content. A routing table can provide information for a node in one neighborhood that an item of content being requested is not stored in the neighborhood, but is stored in a node at another neighborhood. In various embodiments, as taught herein, creating such routing entries can be performed when neighborhoods are identified, based upon connectivity parameters of the node to other nodes within the network of nodes and the selected type of centrality metric. For example, these routing entries can be established when neighborhoods are identified along with initiating a process to distribute content in with nodes with the lowest centrality metric initiate the process, similar to the example discussed above with respect to FIG. 4. Alternatively, the neighborhoods of a network can be flooded, when the neighborhoods are defined relative to how far a request can go from a node.

Figure 5:
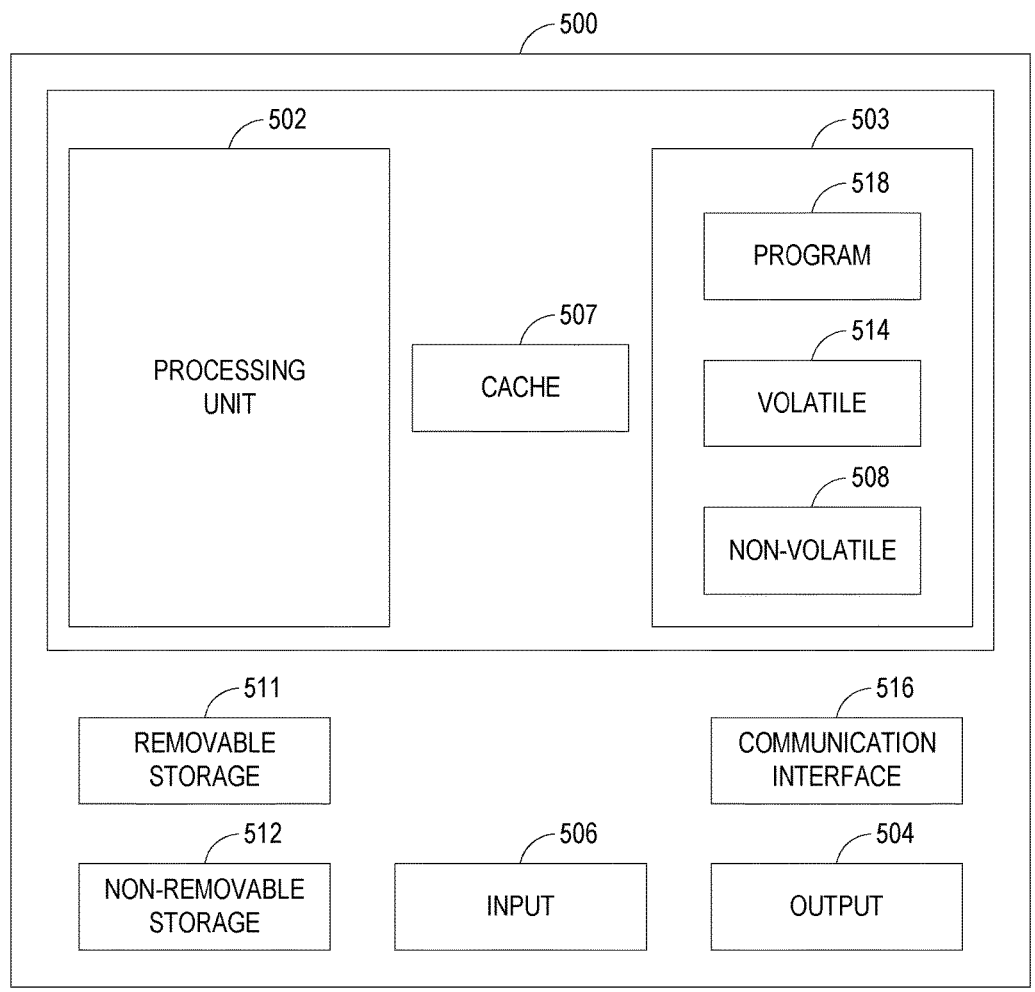
FIG. 5 is a block diagram illustrating circuitry for devices for implementing algorithms and performing methods of caching information in an information-centric network, according to an example embodiment.

FIG. 5 is a block diagram illustrating circuitry for devices for implementing algorithms and performing methods of caching information in an information-centric network, according to the teachings herein. FIG. 5 depicts a device 500 having a non-transitory memory storage 503 storing instructions, a cache 507, and a processing unit 502. Processing unit 502 can include one or more processors operatively in communication with non-transitory memory storage 503 and cache 507. The one or more processors can be structured to execute the instructions to operate device 500 as part of a node of a network of nodes. The one or more processors can be structured to execute the instructions to generate a centrality metric for the node, based upon connectivity of the node to other nodes within the network of nodes; to determine when the centrality metric of the node is a lowest centrality metric of the nodes of the network of nodes with respect to storage of a set of content in caches of the nodes of the network when the content is not currently stored in the network; and to store items of the set of content in cache 507 at the node in order of decreasing popularity from a most popular item, until cache 507 of the node is filled.

Device 500 can include a communication interface 516 operable to receive the centrality metric of each of the other nodes of the network. The received centrality metrics can be used in conjunction with instructions, stored in device 500, to compute the centrality metric at the node within device 500. The instructions can include instructions to compute the position of the node in a listing of centrality metrics of the nodes of the network in order between lowest centrality metric and highest centrality metric using the received centrality metrics and the computed centrality metric. The centrality metric can be a centrality metric selected from a group of centrality metrics including node degree, cardinality of a h-hop neighborhood, cardinality of neighborhoods reachable by the node within the larger network, betweenness centrality, closeness centrality, and eigenvalue centrality. Other centrality metrics may be used depending on the application The one or more processors can be structured to execute the instructions that include instructions to generate a value of popularity of content for each item to be cached in the network by executing one or more operations from a group of operations including reception of the values from a control message generated off line to the device by a content operator, local generation from local monitoring of content, or extraction of an indication as part of a content header from a service provider.

Non-transitory memory storage 503 may be realized as machine-readable media, such as computer-readable media, and may include volatile memory 514 and non-volatile memory 508. Device 500 may include or have access to a computing environment that includes a variety of machine-readable media including as computer-readable media, such as volatile memory 514, non-volatile memory 508, removable storage 511, and non-removable storage 512. Such machine-readable media may be used with instructions in one or more programs 518 executed by device 500. Cache 507 may be realized as a separate memory component or part of one or more of volatile memory 514, non-volatile memory 508, removable storage 511, or non-removable storage 512. Memory storage can include random access memory (RAM), read only memory (ROM), erasable programmable read-only memory (EPROM) and electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions.

Device 500 may include or have access to a computing environment that includes input 506 and output 504. Output 504 may include a display device, such as a touchscreen, that also may serve as an input device. The input 506 may include one or more of a touchscreen, touchpad, mouse, keyboard, camera, one or more device-specific buttons, one or more sensors integrated within or coupled via wired or wireless data connections to device 500, and other input devices. Device 500 may operate in a networked environment using a communication connection to connect to one or more other devices that are remote. Such remote devices may be similar to device 500 or may be different types of devices having features similar or identical to features of device 500 or other features, as taught herein, to distribute content in a network. The remote devices may be computers, such as database servers. Such remote computers may include a personal computer (PC), server, router, network PC, a peer device or other common network node, or the like. The communication connection may include a Local Area Network (LAN), a Wide Area Network (WAN), cellular, WiFi, Bluetooth, or other networks.

Machine-readable instructions such as computer-readable instructions stored on a computer-readable medium are executable by the processing unit 502 of the device 500. A hard drive, CD-ROM, and RAM are some examples of articles including a non-transitory computer-readable medium such as a storage device. The terms machine-readable medium, computer-readable medium, and storage device do not include carrier waves to the extent carrier waves are deemed transitory. Storage can also include networked storage such as a storage area network (SAN).

In various embodiments, a non-transitory machine-readable storage device can comprise instructions stored thereon, which, when performed by a machine, cause the machine to perform operations to store content in caches of a network of nodes, which when executed by one or more processors of the machine, cause the one or more processors to perform operations comprising one or more features similar to or identical to features of methods and techniques described with respect to method 100 and/or method 200, variations thereof, and/or features of other methods taught herein such as associated with FIGS. 1-4. The physical structures of such instructions may be operated on by one or more processors, such as one or more processors of processing unit 503. Executing these physical structures can cause the machine to perform operations comprising operations to: generate a centrality metric for a node, based upon connectivity of the node to other nodes within the network of nodes; determine when the centrality metric of the node is a lowest centrality metric of the nodes of the network of nodes with respect to storage of a set of content in caches of the nodes of the network when the content is not currently stored in the network; and store items of the set of content in the cache at the node in order of decreasing popularity from a most popular item, until the cache of the node is filled. Execution of various instructions may be realized by the control circuitry of the machine. The instructions can include instructions to operate device to distribute items of content to nodes of a network in accordance with the teachings herein.

The instructions can include instructions to compute, within the node, the centrality metric at the node; to communicate with the other nodes of network to advertise its centrality metric and receive the centrality metrics of the other nodes; compute the position of the node in a listing of centrality metrics of the nodes in order between lowest centrality metric and highest centrality metric using the received centrality metrics and the computed centrality metric. The centrality metric can be a centrality metric selected from a group of centrality metrics including node degree, cardinality of a h-hop neighborhood, cardinality of neighborhoods reachable by the node within the larger network, betweenness centrality, closeness centrality, and eigenvalue centrality. Other centrality metrics may be used. The instructions can include instructions to generate a value of popularity of content for each item cached in the device by executing one or more operations from a group of operations including reception of the values from a control message generated off line to the device by a content operator, local generation from local monitoring of content, or extraction of an indication as part of a content header from a service provider.

Device 500 can be realized as a computing device that may be in different forms in different embodiments, as part of a node of a network of nodes. For example, device 500 may be a smartphone, a tablet, smartwatch, other computing device, or other types of devices having wireless communication capabilities, where such devices include components to engage in the distribution and storage of items of content, as taught herein. Devices, such as smartphones, tablets, smartwatches, and other types of device having wireless communication capabilities, are generally collectively referred to as mobile devices or user equipment. In addition, some of these devices may be considered as systems for the functions and/or applications for which they are implemented. Further, although the various data storage elements are illustrated as part of the device 500, the storage may also or alternatively include cloud-based storage accessible via a network, such as the Internet or server based storage.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

What is claimed is:

1. A processor-implemented method of caching information in an information-centric network (ICN) comprising:
    generating, at a node of a network of nodes of the ICN using one or more processors, a centrality metric value for the node, based upon connectivity of the node to other nodes within the network of nodes;
    determining, at the node using the one or more processors, when the centrality metric value of the node is a lowest centrality metric value of the nodes of the network of nodes with respect to storing a set of content in caches of the nodes of the network of nodes, the lowest centrality metric value representing a lowest connectivity to other nodes within the network of nodes, the content not currently stored in the network of nodes; and
    storing, with the node having the lowest connectivity to other nodes within the network of nodes, items of the set of content in the cache at the node in order of decreasing popularity from a most popular item, until the cache of the node is filled.

2. The processor-implemented method of claim 1, wherein generating the centrality metric value for the node includes computing the centrality metric value at the node; and determining, at the node, that the centrality metric value of the node is the lowest centrality metric value includes receiving, at the node, the centrality metric value for each of the other nodes of the network of nodes.

3. The processor-implemented method of claim 2, wherein computing the centrality metric value at the node includes message passing between the node and the other nodes of the network of nodes.

4. The processor-implemented method of claim 1, wherein the network of nodes is a neighborhood of a larger network.

5. The processor-implemented method of claim 4, wherein the centrality metric value is generated by one of node degree, cardinality of a h-hop neighborhood, cardinality of neighborhoods reachable by the node within the larger network, betweenness centrality, closeness centrality, and eigenvalue centrality.

6. The processor-implemented method of claim 5, wherein cardinality of the h-hop neighborhood is based on using a delay constraint associated with transmission of content to another node to define a number of hops in the h-hop neighborhood.

7. A processor-implemented method of caching information in an information-centric network (ICN) comprising:
    at each node of a network of nodes of the ICN, generating, using one or more processors at the node, a centrality metric value for the node, based upon connectivity of the node to other nodes within the network of nodes; and
    storing a set of items of content in the network of nodes, each item of content of the set associated with a value of popularity of the respective item of content, items stored in caches at nodes of the network of nodes with items of decreasing popularity added to the nodes of the network of nodes in increasing order of centrality metric value beginning with an item of the set identified as being most popular content stored in a cache of the node having a lowest centrality metric value, the lowest centrality metric value representing a lowest connectivity to other nodes within the network of nodes, the cache of the node having the lowest centrality metric value filled with items of the set until the cache is filed, each item stored at only one node of the network of nodes.

8. The processor-implemented method of claim 7, wherein generating the centrality metric value for each node includes at each node,
    computing the centrality metric value at the node; and
    communicating the computed centrality metric value to the other nodes within the network of nodes.

9. The processor-implemented method of claim 8, wherein computing the centrality metric value of each node includes message passing among the nodes of the network of nodes.

10. The processor-implemented method of claim 7, wherein the method includes generating the value of popularity of content for each item at each node by one or more of a control message generated off line to the nodes by a content operator, local generation at each node from local monitoring of content, or indication as part of a content header from a service provider.

11. The processor-implemented method of claim 7, wherein the method includes generating a routing table with entries correlated to data at a node that is indicative of content location in the network of nodes.

12. The processor-implemented method of claim 7, wherein the network of nodes is a neighborhood of a larger network having a plurality of neighborhoods in which each item is stored in each neighborhood of the plurality of neighborhoods and each item is stored at only one node in each neighborhood of the plurality of neighborhoods.

13. A device comprising:
a non-transitory memory storage storing instructions;
a cache; and
one or more processors operatively in communication with the non-transitory memory storage, wherein the one or more processors are structured to execute the instructions to operate the device as part of a node of a network of nodes of an information-centric network (ICN) and to:
generate a centrality metric value for the node of the network of nodes, based upon connectivity of the node to other nodes within the network of nodes;
determine when the centrality metric value of the node is a lowest centrality metric value of the nodes of the network of nodes with respect to storage of a set of content in caches of the nodes of the network of nodes, the lowest centrality metric value representing a lowest connectivity to other nodes within the network of nodes, when the content is not currently stored in the network of nodes; and
store, with the node having the lowest connectivity to other nodes within the network of nodes, items of the set of content in the cache at the node in order of decreasing popularity from a most popular item, until the cache of the node is filled.

14. The device of claim 13, wherein the device includes:
a communication interface operable to receive the centrality metric value of each of the other nodes of the network of nodes;
the instructions include instructions to compute the centrality metric value at the node within the device; and
the instructions include instructions to compute a position of the node in a listing of centrality metric values of the nodes in order between lowest centrality metric value and highest centrality metric value using the received centrality metric values and the computed centrality metric value.

15. The device of claim 13, wherein the centrality metric value is generated by one of node degree, cardinality of a h-hop neighborhood, cardinality of neighborhoods reachable by the node within a larger network, betweenness centrality, closeness centrality, and eigenvalue centrality.

16. The device of claim 13, wherein the instructions include instructions to generate a value of popularity of content for each item cached in the device by executing one or more operations from a group of operations including reception of the values of popularity of content from a control message generated off line to the device by a content operator, local generation from local monitoring of content, or extraction of an indication as part of a content header from a service provider.

17. A non-transitory machine-readable media storing instructions to store content in caches of a network of nodes of an information-centric network (ICN), which when executed by one or more processors, cause the one or more processors to perform operations to:
generate a centrality metric value for a node of the ICN, based upon connectivity of the node to other nodes within the network of nodes;
determine when the centrality metric value of the node is a lowest centrality metric value of the nodes of the network of nodes with respect to storage of a set of content in caches of the nodes of the network of nodes, the lowest centrality metric value representing a lowest connectivity to other nodes within the network of nodes, when the content is not currently stored in the network of nodes; and
store, with the node having the lowest connectivity to other nodes within the network of nodes, items of the set of content in the cache at the node in order of decreasing popularity from a most popular item, until the cache of the node is filled.

18. The non-transitory machine-readable media of claim 17, wherein the instructions include instructions to:
compute, within the node, the centrality metric value at the node;
communicate with the other nodes of the network of nodes to advertise its centrality metric value and receive the centrality metric values of the other nodes; and
compute a position of the node in a listing of centrality metric values of the nodes in order between lowest centrality metric value and highest centrality metric value using the received centrality metric values and the computed centrality metric value.

19. The non-transitory machine-readable media of claim 17, wherein the centrality metric value is generated by one of node degree, cardinality of a h-hop neighborhood, cardinality of neighborhoods reachable by the node within a larger network, betweenness centrality, closeness centrality, and eigenvalue centrality.

20. The non-transitory machine-readable media of claim 17, wherein the instructions include instructions to generate a value of popularity of content for each item cached in the node by executing one or more operations from a group of operations including reception of the values of popularity of content from a control message generated off line to the node by a content operator, local generation from local monitoring of content, or extraction of an indication as part of a content header from a service provider.

* * * * *